(12) United States Patent
Eickhoff et al.

(10) Patent No.: US 10,078,461 B1
(45) Date of Patent: Sep. 18, 2018

(54) PARTIAL DATA REPLAY IN A DISTRIBUTED MEMORY BUFFER SYSTEM

(71) Applicant: International Business Machines Corporation, Armonk, NY (US)

(72) Inventors: Susan M. Eickhoff, Hopewell Junction, NY (US); Steven R. Carlough, Poughkeepsie, NY (US); Patrick J. Meaney, Poughkeepsie, NY (US); Stephen J. Powell, Austin, TX (US); Jie Zheng, Poughkeepsie, NY (US); Gary A. Van Huben, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/816,138

(22) Filed: Nov. 17, 2017

Related U.S. Application Data

(63) Continuation of application No. 15/782,089, filed on Oct. 12, 2017.

(51) Int. Cl.
*G06F 3/06* (2006.01)
*G06F 11/10* (2006.01)
*G06F 11/14* (2006.01)

(52) U.S. Cl.
CPC .......... *G06F 3/0619* (2013.01); *G06F 3/0613* (2013.01); *G06F 3/0656* (2013.01);
(Continued)

(58) Field of Classification Search
None
See application file for complete search history.

(56) References Cited

U.S. PATENT DOCUMENTS 6,499,083 B1 * 12/2002 Hamlin ................. G06F 3/0611
   711/112
7,991,750 B1 * 8/2011 Xavier ................. H04L 1/1809
   707/690

(Continued)

FOREIGN PATENT DOCUMENTS

JP       58023395 A  *  2/1983  ............. G06F 11/00
JP    2005018443 A  *  1/2005

OTHER PUBLICATIONS

'Generic Soft-Error Detection and Correction for Concurrent Data Structures' by Christoph Borchert et al., IEEE Transactions on Dependable and Secure Computing, vol. 14, No. 1, Jan./Feb. 2017.*

(Continued)

*Primary Examiner* — Steven Snyder
(74) *Attorney, Agent, or Firm* — Edward J. Wixted, III (57) ABSTRACT

A host divides a dataset into stripes and sends the stripes to respective data chips of a distributed memory buffer system, where the data chips buffer the respective slices. Each data chip can buffer stripes from multiple datasets. Through the use of: (i) error detection methods; (ii) tagging the stripes for identification; and (iii) acknowledgement responses from the data chips, the host keeps track of the status of each slice at the data chips. If errors are detected for a given stripe, the host resends the stripe in the next store cycle, concurrently with stripes for the next dataset. Once all stripes have been received error-free across all the data chips, the host issues a store command which triggers the data chips to move the respective stripes from buffer to memory.

1 Claim, 6 Drawing Sheets

(52) U.S. Cl.
CPC ........ *G06F 3/0673* (2013.01); *G06F 11/1004* (2013.01); *G06F 11/14* (2013.01); *G06F 2211/109* (2013.01)

(56) References Cited

U.S. PATENT DOCUMENTS

| | | | | |
|---|---|---|---|---|
| 8,019,938 | B2* | 9/2011 | Flynn | G06F 3/0613 711/113 |
| 8,225,136 | B2* | 7/2012 | Igashira | G06F 11/1076 711/114 |
| 8,370,715 | B2* | 2/2013 | Hafner | G06F 11/1076 714/769 |
| 8,713,357 | B1* | 4/2014 | Jean | G06F 11/0727 714/6.1 |
| 8,762,771 | B2* | 6/2014 | Jess | G06F 11/1443 714/6.22 |
| 9,015,558 | B2 | 4/2015 | Wang et al. | |
| 9,747,162 | B2* | 8/2017 | Ben Dayan | G06F 11/1076 |
| 9,880,783 | B2* | 1/2018 | Sela | G06F 3/0656 |
| 9,952,781 | B2* | 4/2018 | Orme | G06F 3/0619 |
| 9,959,059 | B2* | 5/2018 | Orme | G06F 3/0619 |
| 2005/0278568 | A1* | 12/2005 | Delaney | G06F 11/1076 714/13 |
| 2008/0256420 | A1* | 10/2008 | Hafner | G06F 11/1004 714/770 |
| 2009/0313498 | A1* | 12/2009 | Igashira | G06F 11/1076 714/6.12 |
| 2011/0302358 | A1* | 12/2011 | Yu | G06F 11/108 711/103 |
| 2013/0117603 | A1* | 5/2013 | Jess | G06F 11/1088 714/6.22 |
| 2014/0136916 | A1 | 5/2014 | Martin et al. | |
| 2014/0189424 | A1* | 7/2014 | Sim | G06F 11/1096 714/6.24 |
| 2014/0281783 | A1 | 9/2014 | Hodges et al. | |
| 2015/0163014 | A1 | 6/2015 | Birrittella | |
| 2015/0193158 | A1 | 7/2015 | Yoon et al. | |
| 2015/0199151 | A1* | 7/2015 | Klemm | G06F 3/0689 711/114 |
| 2016/0110125 | A1* | 4/2016 | Orme | G06F 3/0619 711/102 |
| 2016/0110249 | A1* | 4/2016 | Orme | G06F 3/0619 714/6.24 |
| 2016/0188398 | A1 | 6/2016 | Gilda et al. | |
| 2017/0123721 | A1* | 5/2017 | Sela | G06F 3/0656 |
| 2017/0123722 | A1* | 5/2017 | Sela | G06F 3/0656 |
| 2017/0123944 | A1* | 5/2017 | Macko | G11B 20/10527 |

OTHER PUBLICATIONS

'Dynamic Partial CRC with Flexible Chunk Policy for SCTP over Lossy Channel' by Cui and Koh, copyright 2008, IEEE.*
'Stream Control Transmission Protocol' by R. Stewart et al., Oct. 2000.*
'A Performance Study of Discrete-Error-Checking Scheme (DECS) with the Optimal Division Locations for IEEE 802.16-Based Multihop Networks' by Yue-Ru Chuang et al., IEEE Transactions on Computers, vol. 62, No. 12, Dec. 2013.*
Meaney et al., "The IBM z13 memory subsystem for big data", IBM Journal of Research and Development, vol. 59; Issue 4/5; Jul.-Sep. 2015, 11 pages.
Eickhoff et al., "Partial Data Replay in a Distributed Memory Buffer System", U.S. Appl. No. 15/782,089, filed Oct. 12, 2017, 32 pages.
IBM Appendix P, list of patents and patent applications treated as related, filed herewith, 2 pages.

* cited by examiner

PARTIAL DATA REPLAY IN A DISTRIBUTED MEMORY BUFFER SYSTEM

BACKGROUND OF THE INVENTION

The present invention relates generally to the field of computer data storage, and more particularly to data storage in a high speed distributed memory buffer system.

In the field of computer data storage, data striping is a technique where sequential data, such as a file is divided into segments, and the segments are sent off to be distributed among different physical storage devices operating concurrently. Striping provides greater throughput than can be provided by a single storage device.

SUMMARY

According to an aspect of the present invention, there is a method, computer program product and/or system that performs the following operations (not necessarily in the following order): (i) sending, on a first data cycle, a first stripe of a first dataset and a second stripe of the first dataset, to a first data chip buffer and a second data chip buffer, respectively; (ii) receiving first information indicating that: (a) the first stripe of the first dataset was received, at the first data chip buffer, with no errors; and (b) the second stripe of the first dataset was received, at the second data chip buffer, with errors; (iii) in response to receiving the first information, sending, on a second data cycle, a first stripe of a second dataset, and the second stripe of the first dataset, to the first data chip buffer and the second data chip buffer, respectively; (iv) receiving second information indicating that the second stripe of the first dataset was received, at the second data chip buffer, with no errors; (v) in response to receiving the second information, sending a store command and a target address corresponding to the first dataset; (vi) triggering the first data buffer to send the first stripe of the first dataset to a first memory address, based at least in part, on the target address; and (vii) triggering the second data buffer to send the second stripe of the first dataset to a second memory address, based at least in part, on the target address. The first stripe of the first dataset comprises a first portion of the first dataset, an error detection code, and a tag that identifies the first portion of the first dataset. The first portion of the first dataset comprises at least one bit of the first dataset. The first data buffer and the second data buffer are physically separate from one another.

DETAILED DESCRIPTION

In some embodiments of the present invention, a host central processor (CPU) divides a first dataset into stripes. On a first store cycle, the CPU sends the stripes across respectively corresponding high speed serialize/de-serialize (HSS) links to a distributed memory buffer system comprising multiple data chips and an address chip. Each data chip buffer receives a corresponding stripe of the first dataset.

An error detecting process at each data chip determines if the data in its buffer is good. Each data chip returns an acknowledgement (ACK) signal if the data in its buffer is determined to be error-free; or a negative-acknowledgement (NACK) signal if the data is determined to contain errors. The host CPU keeps track of the ACK/NACK signals.

If all the data chips report with ACK signals corresponding to the first dataset, the host CPU sends a store command and a memory address to the address chip. On receiving the store command and memory address associated with the first dataset, the address chip issues a store command to the data chips. In response, the data chips store out the buffered data (corresponding to the first dataset) to memory at the memory address. If the host receives any NACK signals, it resends, on the next data store cycle, the corresponding stripe of the first dataset to the corresponding data chip, while concurrently sending stripes of a second dataset to all the memory chips except any ones from which the CPU received NACK signals.

The CPU continues with subsequent data store cycles, wherein for each data chip, the CPU: (i) re-sends a stripe that was received with errors in the previous cycle, or (ii) sends a stripe of the next data set for any data chips which received, without errors, the previous stripe. In this fashion, any data stripe that is received at the target data chip without errors is sent only one time, while any data stripe that is received at the target data chip with errors is resent during the next data store cycle.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
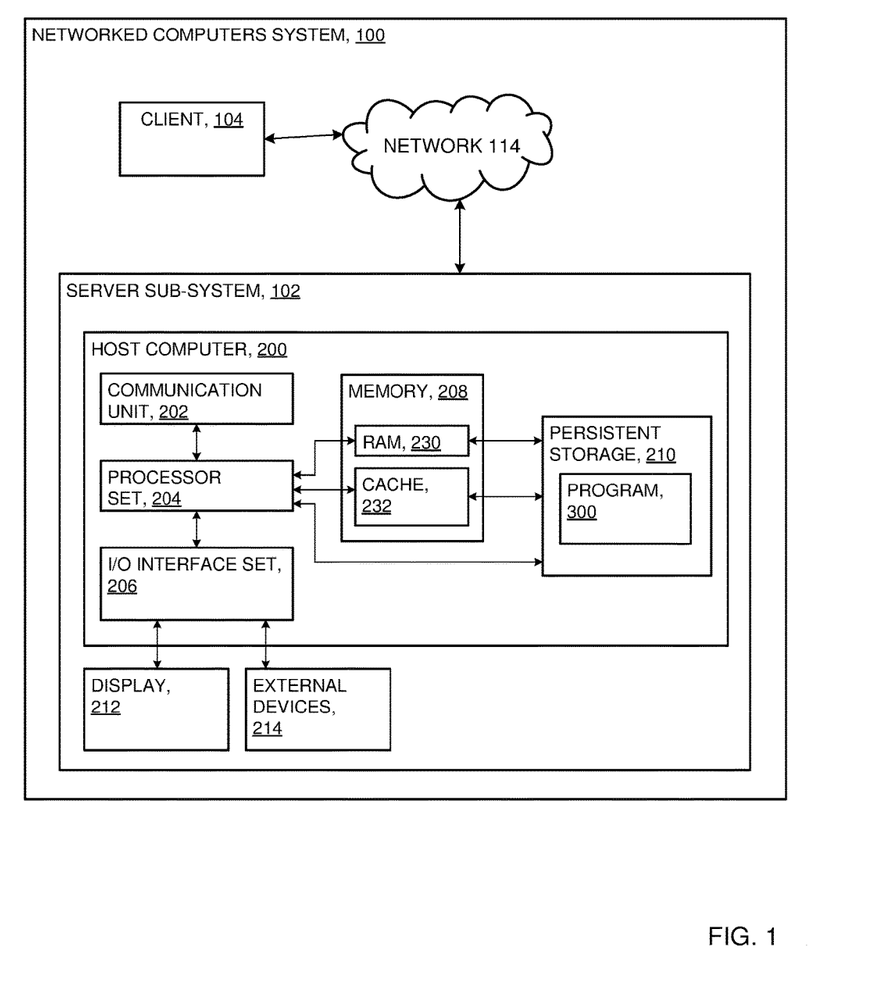
FIG. 1 is a functional block diagram showing a computing environment in accordance with at least one embodiment of the present invention.

An embodiment of a possible hardware and software environment for software and/or methods according to the present invention will now be described in detail with reference to the Figures. FIG. 1 is a functional block diagram illustrating various portions of networked computers system 100, including: client computer 104; communication network 114; host computer 200; communication unit 202; processor set 204 (also sometimes herein referred to as CPU 204); input/output (I/O) interface set 206; memory device 208; persistent storage device 210; display device 212; external device set 214; random access memory (RAM) devices 230; cache memory device 232; and program 300.

Server sub-system 102 is, in many respects, representative of the various computer sub-system(s) in the present invention. Accordingly, several portions of server sub-system 102 will now be discussed in the following paragraphs.

Server sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Server sub-system 102 is shown as a block diagram with many double arrows. These double arrows (no separate reference numerals) represent a communications fabric, which provides communications between various components of server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for server sub-system 102; and/or (ii) devices external to server sub-system 102 may be able to provide memory for server sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information. Alternatively, in some embodiments, persistent storage 210 may include non-volatile or flash storage on a non-volatile dual inline memory module (NVDIMM) for example, comprising an address chip (AC chip) and a plurality of data buffer chips (DC chips).

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to server sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with host computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
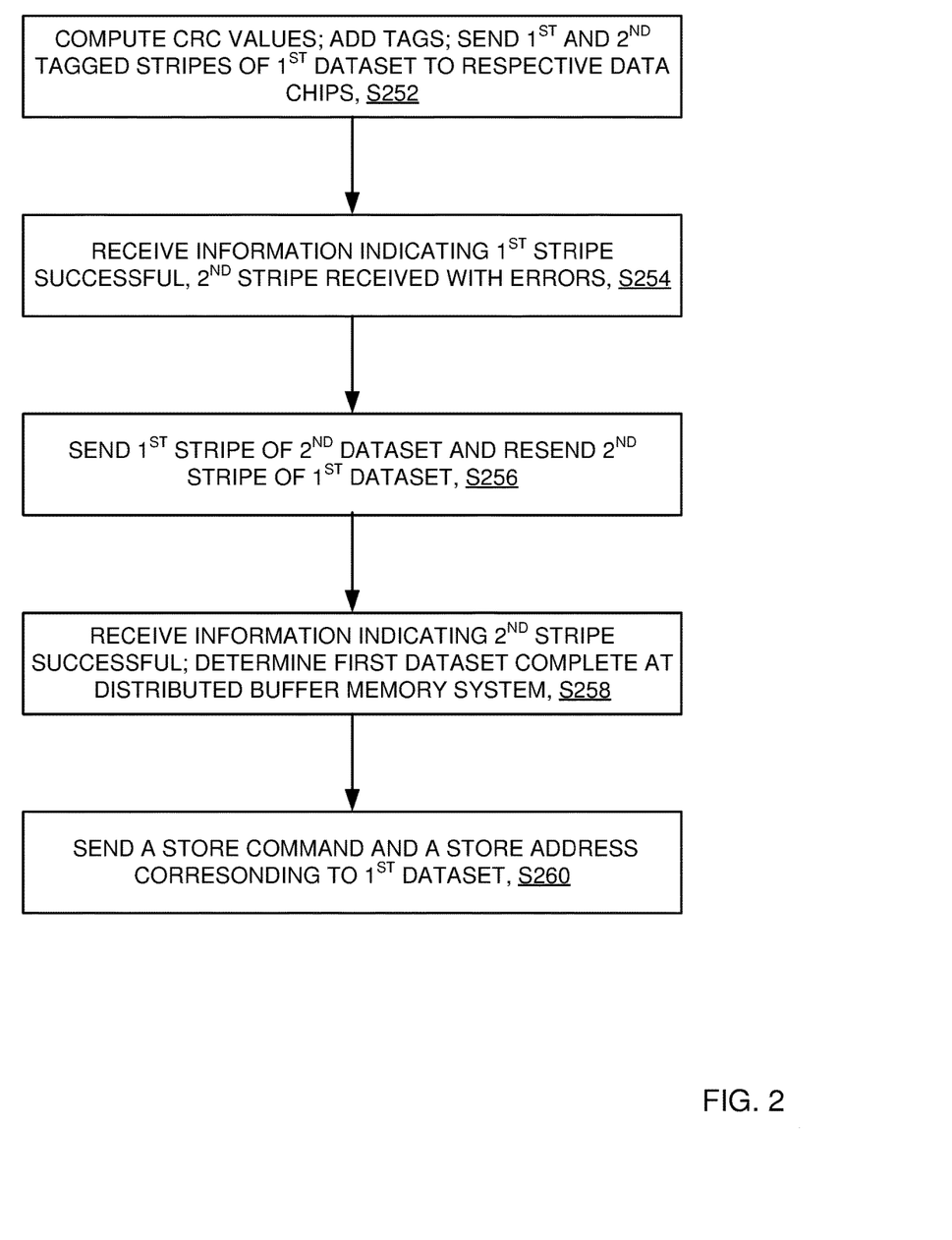
FIG. 2 is a flowchart showing a method performed, at least in part, in accordance with at least one embodiment of the present invention.
Figure 3:
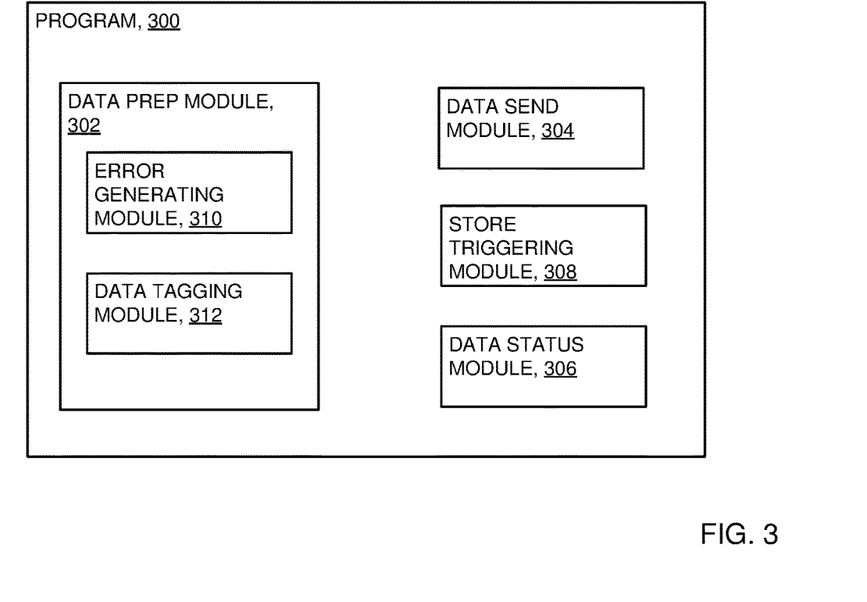
FIG. 3 is a block diagram showing a machine logic (for example, software) portion of a system in accordance with at least one embodiment of the present invention.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S252, where data preparation module 302, of program 300, receives a first dataset for storage in the distributed memory buffer system. The data preparation module divides the first dataset into individual stripes. In the example embodiment method of FIG. 2, the first dataset is divided into two stripes. It should be appreciated that in some embodiments of the present invention, the first dataset may be divided into any number of stripes (for example, ten stripes of 1 bit each, to correspond with a buffer bus that is ten bits wide). Once the first dataset has been striped, each individual stripe is tagged with identifying and/or error detecting information. For example, in at least one embodiment, data tagging module 312, of data preparation module 302, tags each stripe with information that identifies the dataset to which the stripe belongs, and which stripe within the dataset it is. In the example embodiment of FIG. 2, error generating module 310, of data preparation module 302, computes a cyclic redundancy checksum (CRC) for each stripe. The data tagging module 312 further tags each stripe with the corresponding CRC checksum. Once the first and second stripes of the first dataset are ready to be sent to the distributed memory buffer system, data send module 304 sends the stripes, in a first store cycle, on respective high speed serialize/de-serialize links (HSS links), to respective data chips. For example, in the first store cycle, the data send module sends the first stripe on a first HSS link to a first data chip, and concurrently sends the second stripe on a second HSS link to a second data chip. The data chips, acting in concert, comprise a distributed buffer, where each data chip respectively corresponds to a memory chip, such as a random access memory chip (RAM chip) on a dual inline memory module (DIMM).

Processing proceeds at operation S254 where data status module 306 receives acknowledgement information (ACK and/or NACK) from the data chips indicating status of the first and second stripes at the respective data chips. In the embodiment of FIG. 2, an acknowledgement (ACK) signal sent from the first data chip and received by the data status module indicates that the first stripe was received successfully (without errors). A negative-acknowledgement (NACK) sent from the second data chip and received by the data status module indicates that the second stripe received at the second data chip has an error. The error, in this embodiment, is detected by computing, at the data chips, a CRC value for the respective data stripe as received, and comparing the CRC value thus computed with the CRC value that was sent along with the data stripe from data send module 304. In this example embodiment, the two CRC values for the first data stripe match (thus, no errors are detected, triggering the ACK signal from the first data chip) and the two CRC values for the second data stripe do not match (thus indicating that error(s) have been detected and triggering the NACK signal from the second data chip.

Processing proceeds to operation S256, where data preparation module 302 receives a second dataset for storage into the distributed memory buffer system. The data preparation module 302 prepares the second dataset in the same fashion as it prepared the first dataset in operation S252 above. Once the second dataset is ready to be sent, data send module 304 performs a second data store cycle wherein the data send module concurrently: (i) sends a first stripe of the second dataset; and (ii) re-sends the second stripe of the first dataset.

Processing proceeds to operation S258, where data status module 306 receives an acknowledgement (ACK) signal sent from the second data chip which indicates that the second stripe of the first dataset has been successfully received (without error) at the second data chip. Data status module has now determined that the all stripes (in this example embodiment, the first and second stripes) corresponding to the first dataset have been received at the distributed memory buffer system, and thus, the first dataset is complete without errors at the memory system.

Processing proceeds at operation S260, where in response to data status module 306 having determined that the first dataset is complete without errors at the memory system, store triggering module 308 issues a store command and a memory address to an address chip. The address chip issues store commands to the data chips, which, in response to receiving the store commands, proceed to store respective slices of the first dataset at the memory address of a respective memory device. In particular, in this example embodiment, the first data chip stores the first stripe of the first dataset at the memory address of a corresponding first memory module, and the second data ship stores the second stripe of the first dataset at the memory address of a corresponding second memory module. Alternatively, upon receiving the store command, the address chip pulls the data from the respective data chips and stores the data to memory. It is to be understood that there are many possible memory configurations in keeping with the spirit of the present invention. As two examples, among many possible examples, the first and second data chips may each be part of respectively corresponding first and second memory modules, or they may be on chips that are separate from the memory modules. It is to be further understood that the memory address included in the store command issued to the address chip, and relayed to the data chips, may be a virtual address which is subsequently translated to a physical address, on a physical memory device, to which the data is eventually stored.

III. Further Comments and/or Embodiments

Some embodiments of the present invention may include one, or more, of the following features, characteristics, and/or advantages: (i) focuses on the host to memory buffer bus where the memory buffer chip is distributed; (ii) performs error correction no matter how many bits have flipped; (iii) buffers read data into the memory buffer chip; (iv) allows for out of sync reads across multiple RAM chips; (v) allows for fine (single bit) granularity data recovery/replay; (vi) allows for elasticity in how the data is sent from the host to the data chips; (vii) minimizes data recovery overhead in a distributed system; and/or (viii) provides bandwidth savings (avoids 'wasting' bandwidth on resending data that was already sent and successfully received). Further with respect to item (vii), if one high speed serialize/de-serialize (HSS) channel takes a transmission error, the data on only the failing channel is replayed, while the other channels continue to make forward progress transmitting data.

Some embodiments of the present invention comprise a distributed memory buffer system. A host processor stripes data across a number (N) of data chips where it sends cyclic redundancy check (CRC) protected data to the data chips (DC chips). The host sends the data on a high speed serialize/de-serialize (HSS) channel. There is a respective HSS channel corresponding to each DC chip. After an entire set of data is successfully received by the DC chips, the host sends send a store command and address to the address chip (AC). Once the address chip receives the command and address, the address chip issues the store command where in response, the data chips store the data at the provided address.

Some embodiments of the present invention provide a mechanism for the DC chips to buffer multiple sets of data. This allows more elasticity from the host to DC chips in cases where errors occur on only a subset of the N DC chips. To provide this elasticity, the DC chips store more than one set of data, and the host sends a tag along with each set of data. The DC chip uses this tag to keep track of which set of data it just received, and uses it again later to write out the correct set of data when later asked to do so.

After receiving a set of data, a DC chip checks for good CRC. The DC chip responds back to the host, over the respective HSS channel) with either an ACK signal (indicating good data received) or a NACK signal (indicating the data has picked up error(s)). If the host receives a NACK signal, the host resends the data to the DC chip that reported the NACK. The host proceeds to send the next set of data to all other DC chips. Once the host knows an entire set of data has been successfully received by the N DC chips, it issues a "store from buffer to memory" command to the AC chip. The "store from buffer to memory" command includes the memory address location. The AC chip then proceeds with the store out to memory.

In some embodiments of the present invention, a host processor sends a first striped dataset to a set of data chips (DC) over a respectively corresponding set of channels. Each stripe is directed to a corresponding DC and each stripe has an associated CRC checksum. The host receives back from each DC, either an ACK signal (acknowledge, indicating successful receipt of the data) or a NACK signal (negative acknowledgement, indicating that the data has errors). The host concurrently: (i) re-transmits data to any DC that returned a NACK signal; and (ii) transmits a second striped CRC set of data to the DC chips that returned an ACK signal with respect to the first set of data. Further with respect to item (i) above, if all DC channels respond with NACK signals, the host replays/re-transmits the complete set of data, over the corresponding channels, to the respective DC chips.

In response to receiving ACK signals from all DC chips, with respect to a given set of data, the host issues (to an address chip (AC)), a "store from buffer to memory" command. In response to receiving the "store from buffer to memory" command, the AC triggers the DC chips to store the corresponding data to memory.

Figure 4:
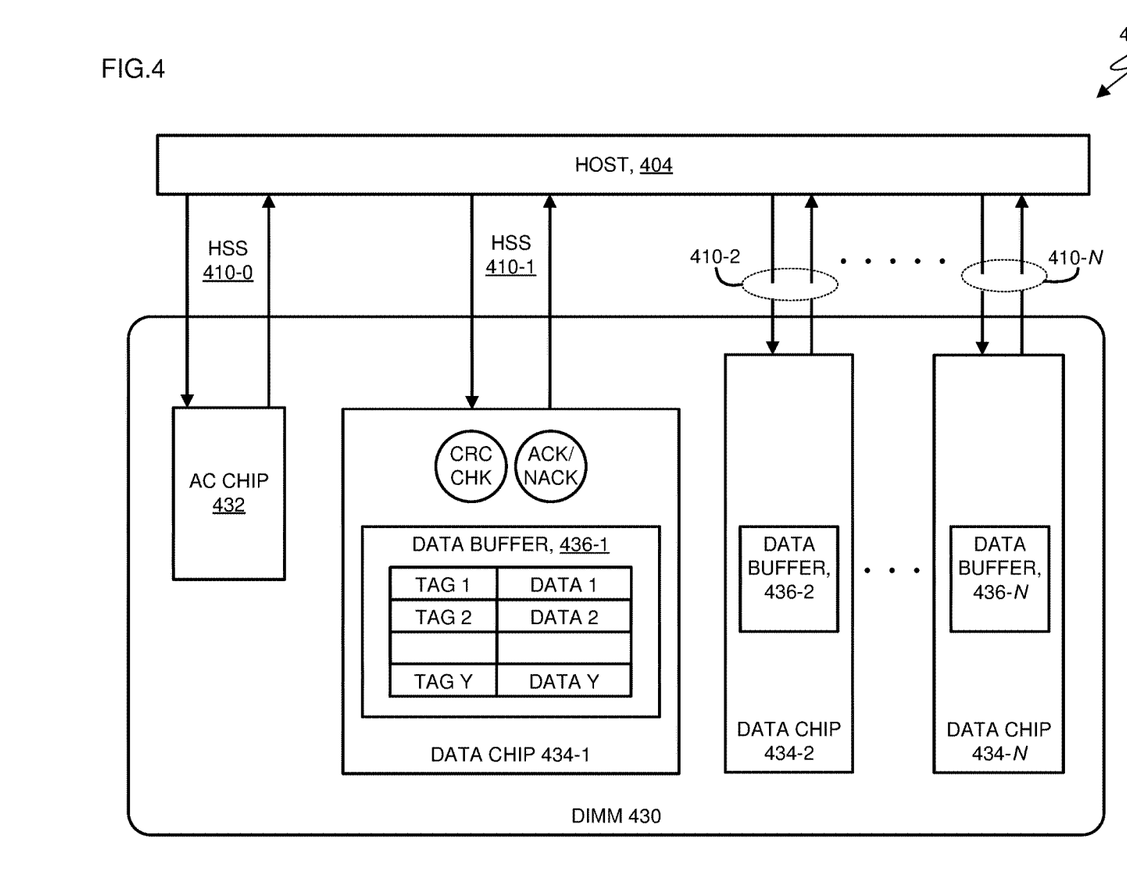
FIG. 4 is a functional block diagram showing components in a distributed memory buffer system in accordance with at least one embodiment of the present invention.

Turning now to FIG. 4, distributed memory buffer system 400, in accordance with some embodiments of the present invention, is shown. The distributed memory buffer system includes: a host 404 (sometimes herein referred to as a central processor unit (CPU), a processor or processor set); a series of high speed serialize/de-serialize (Ser/Des) links (HSS links) 410-0, 410-1, 410-2, through 410-N; dual inline memory module DIMM 430; AC chip 432; data chips 434-1, 434-2, through 434-N; and data buffers 436-1, 436-2 through 436-N.

Host 404 is operationally coupled with DIMM 430, through the HSS links. In particular, HSS 410-0 couples the host with AC chip 432; HSS 410-1 couples the host with data chip 434-1; HSS 410-2 couples the host with data chip 434-2; and so on through HSS 410-N which couples the host with data chip 434-N.

Each data chip includes a data buffer. For example: data chip 434-1 includes data buffer 436-1; data chip 434-2 includes data buffer 436-2; and so on through data chip 434-N which includes data buffer 436-N.

Each data chip is capable of performing error detection (through any type of error detection code now known or to be developed in the future) represented in FIG. 4 as CRC CHK associated with data chip 434-1. Each data chip is further capable of sending ACK and NACK acknowledgement signals, represented in FIG. 4 as ACK/NACK. The ACK/NACK signals are discussed above in section II (Example Embodiment) with reference to FIG. 2.

Figure 5:
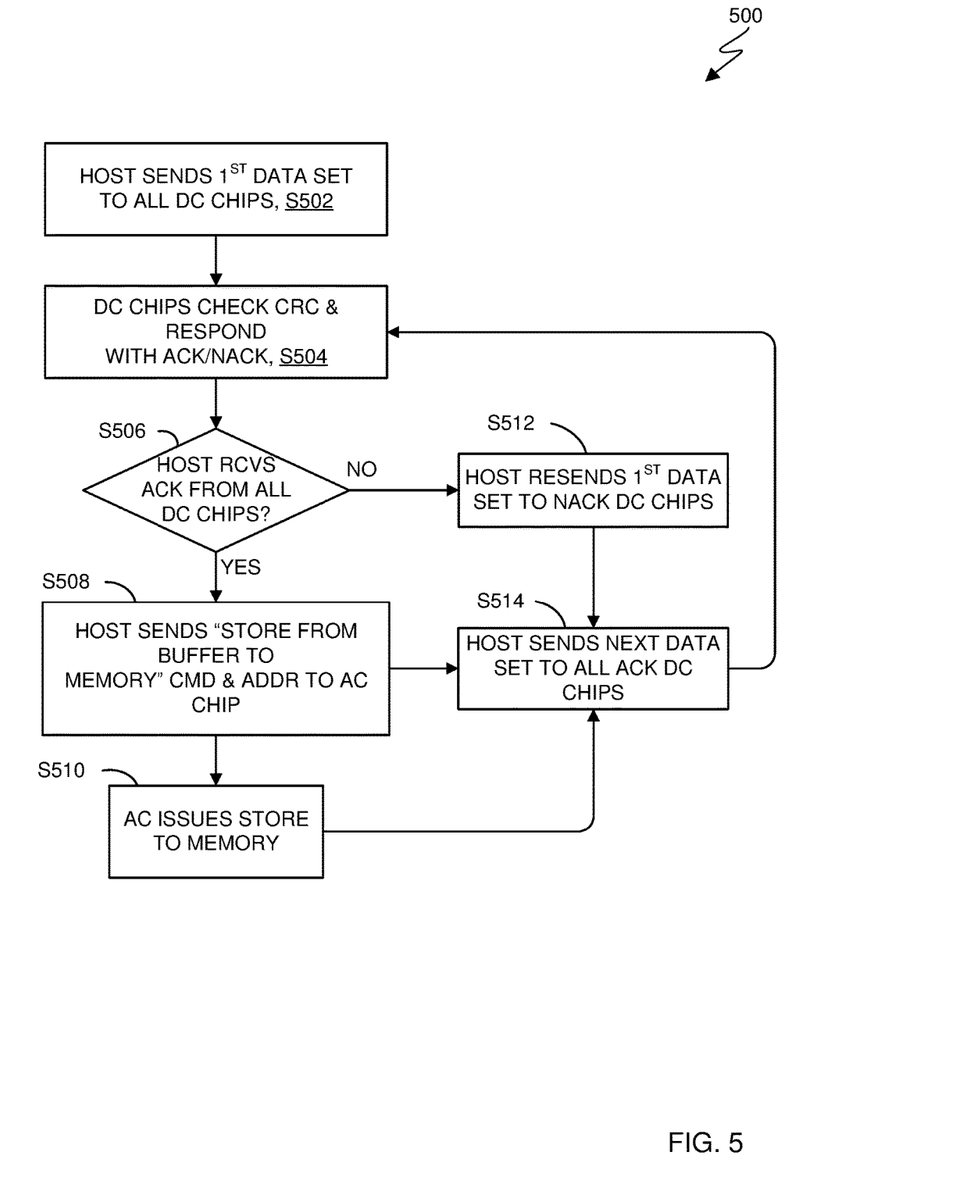
FIG. 5 is a flowchart showing a method performed, at least in part, in accordance with at least one embodiment of the present invention.

Flowchart 500 of FIG. 5 includes the following operations (with process flow among and between the operations as shown by arrows in FIG. 5): S502, S504, S506, S508, S510, S512, and S514. Processing begins at operation S502 where a host system, CPU, or other processor divides a dataset into slices, applies identifying information to each slice and appends error detection information (for example, a CRC checksum). The host then sends the data slices on respective data channels to respective data chips (or any type of buffer suitable for the purpose of holding the data slices until commanded to store the data slices in a memory unit.

Processing proceeds at operation S504, where each data chip receives a respective data slice, performs an error detection routine, and responds to the host with information indicating whether the data slice had been received with or without error. In some embodiments of the present invention, the response is in the form of an ACK signal (no error) or a NACK signal (errors detected).

Processing proceeds at decision S506, where the host keeps track of the ACK and/or NACK signals, to determine if and when all data slices of the dataset have been received at the respective data chips without error. If all data chips returned ACK signals (decision S506, "Yes" branch), processing proceeds at operation S508 where the host sends a store command and a target address to, for example, an address chip, where in response, the address chip triggers the data chips to release the respective slices into the distributed memory system at addresses based on the target address. In response to receiving store command and target address, the address chip triggers the data chips to commit the respective buffered data slices to memory addresses based on the target address (S510).

In parallel with operation S508, the host prepares and sends slices of the next dataset to respective data chips at operation S514, following which processing proceeds again at operation S504.

If one or more data chips returns a NACK signal (decision S506, "No" branch), processing proceeds at operation S512, where the host resends any data slices for which the host received a NACK signal. Concurrently with sending the data slices associated with a NACK signal, on the corresponding channels, the host sends data slices for the next dataset, on channels corresponding to those data chips which returned an ACK signal in operation S504 above.

By way of example, consider a host that needs to store two datasets, A and B. The host prepares and sends (S502) slices A1, A2, and A3 of dataset A to data chips 1, 2, and 3 respectively, on a first store cycle. Data chips 1 and 2 respond with ACK signals and data chip 3 responds with a NACK signal (S504). On a second store cycle, host re-sends slice A3 to data chip 3 (S506, "No" branch, and S512) and concurrently sends (S514) slices B1 and B2 (of dataset B), to data chips 1 and 2 respectively. All data chips perform error detection routines and return ACK signals (S504, and S506, "Yes" branch). Host sends (S508) a store command, corresponding to dataset A, to AC chip 432, which responds by triggering (S510) the data chips to move the data slices A1, A2, and A3 to memory. On a third store cycle, host sends data slice B3 to data chip 3 (S514), data chip 3 performs an error detection routine, and returns ACK signal (S504, and S506, "Yes" branch). Host sends (S508) a store command to the AC chip, which responds by triggering (S510 the data chips to move the data slices B1, B2, and B3 to memory.

Figure 6:
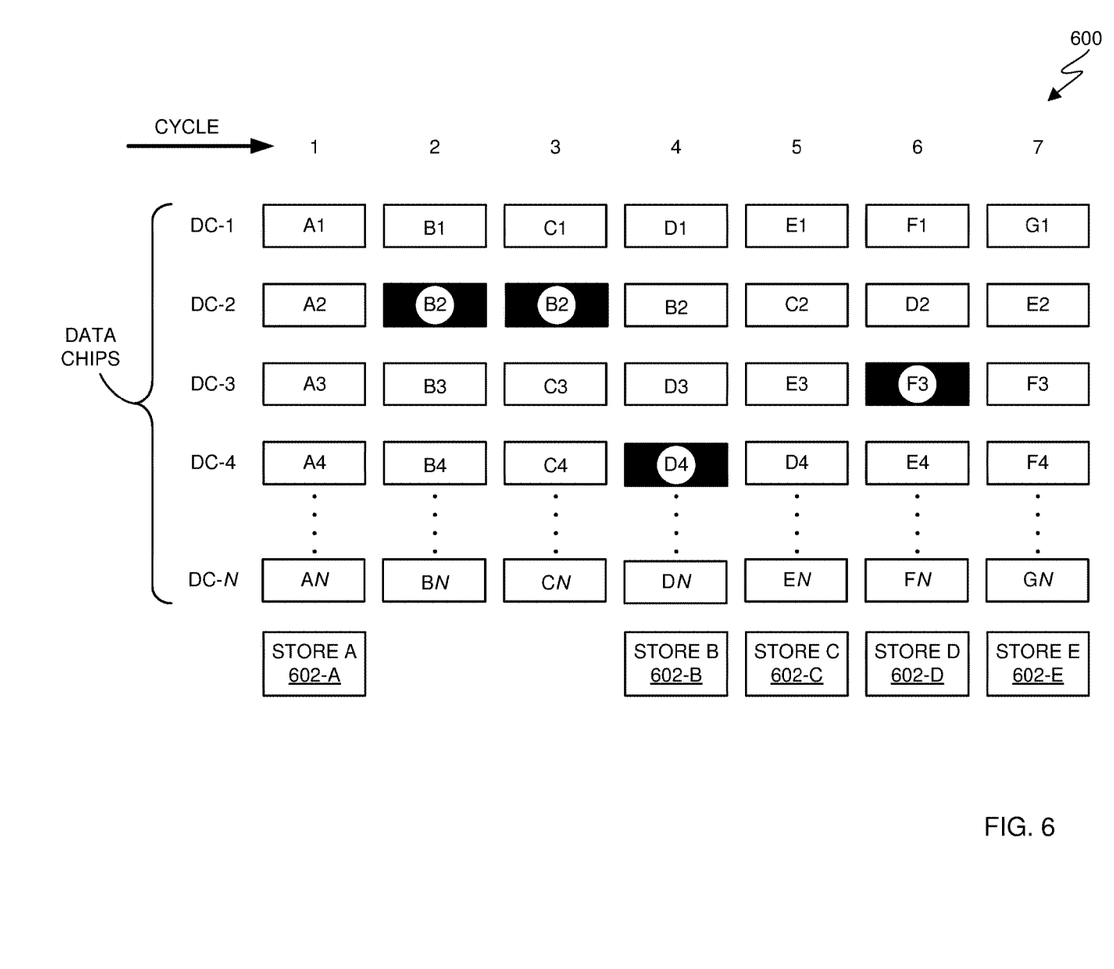
FIG. 6 is a sequence diagram showing a data transmission and commit to memory sequence in accordance with at least one embodiment of the present invention.

Sequence diagram 600 of FIG. 6 shows a series of store cycles in accordance with some embodiments of the present invention. Store cycles are represented in FIG. 6 as columns numbered 1 through 7. Data chip buffers are represented as rows DC-1 through DC-N. In store cycle 1, host 404 (see FIG. 4), sends slices of dataset A (A1, A2, A3, and A4 through AN) to the distributed memory buffer system. In the present example, all the data slices of dataset A are received without error at the respective data chip buffers. All the data chips send ACK signals to the host. The host, having now received ACK signals corresponding to all slices of dataset A (A1 through AN), issues to the distributed memory buffer system store A command 602-A, the command including a memory address. In response, data chips DC-1 through DC-N release their respective slices of dataset A to the indicated memory address.

In store cycle 2, host 404 sends slices of dataset B (B1 through BN) to the distributed memory buffer system. In the present example, slices B1, and B3 through BN are received without error at the respective data chip buffers. Data chips DC-1, and DC-3 through DC-N send ACK signals back to the host. Data chip DC-2 detects a data error in slice B2 and sends a NACK signal back to the host.

In store cycle 3, host 404 sends the following data slices to the distributed memory buffer system: C1 to data chip DC-1; B2 to data chip DC-2; and C3 through CN to data chips DC-3 through DC-N respectively. Data chips DC-1, and DC-3 through DC-N send ACK signals back to the host. Data chip DC-2 again detects a data error in slice B2 and sends a NACK signal back to the host.

In store cycle 4, host 404 sends the following data slices to the distributed memory buffer system: D1 to data chip DC-1; B2 to data chip DC-2; and D3 through DN to data chips DC-3 through DC-N respectively. All data chips except for data chip DC-4 send ACK signals back to the host, having received their respective data slices without error. Data chip DC-4 detects a data error in slice D4 and sends a NACK signal back to the host. Data chip DC-2 has finally received data slice B2 without error, and returns an ACK signal, with respect to data slice B2, to the host. The host, having now received ACK signals corresponding to all slices of dataset B (B1, and B3 through BN in connection with cycle 2, and B2 in connection with cycle 4), issues to the distributed memory buffer system store B command 602-B, the command including a memory address. In response, data chips DC-1 through DC-N release their respective slices of dataset B to the indicated memory address.

In store cycle 5, host 404 sends the following data slices to the distributed memory buffer system: E1 to DC-1; C2 to DC-2; E3 to DC-3; D4 to DC-4; and the remaining slices of dataset E to the respectively corresponding remaining data chips through DC-N. All data chips respond to the host with ACK signals. The host, having now received ACK signals for all slices of dataset C (C1, and C3 through CN in connections with cycle 3, and C2 in connection with cycle 5), issues store C command 602-C to the distributed memory buffer system, the command including a memory address. In response, data chips DC-1 through DC-N release their respective slices of dataset C to the indicated memory address.

In store cycle 6, host 404 sends the following data slices to the distributed memory buffer system: F1 to DC-1; D2 to DC-2; F3 to DC-3; E4 to DC-4; and the remaining slices of dataset F to the respectively corresponding remaining data chips through DC-N. Data chips DC-1, DC-2, and DC-4 through DC-N respond to the host with ACK signals. Data chip DC-3 responds to the host with a NACK signal, having detected an error in data slice F3. The host, having now received ACK signals for all slices of dataset D (D1, and D3 through DN (with the exception of D4) in connection with store cycle 4, D4 in connections with cycle 5, and D2 in connection with cycle 6), issues store D command 602-D to the distributed memory buffer system, the command including a memory address. In response, data chips DC-1 through DC-N release their respective slices of dataset D to the indicated memory address.

In store cycle 7, host 404 sends the following data slices to the distributed memory buffer system: G1 to DC-1; E2 to DC-2; F3 to DC-3; F4 to DC-4; and the remaining slices of dataset G to the respectively corresponding remaining data chips through DC-N. All data chips respond to the host with ACK signals, having received their respective data slices without error. The host, having now received ACK signals for all slices of dataset E (E1, and E3 through EN with the exception of E4, in connection with store cycle 5, E4 in connection with store cycle 6, and E2 in connections with store cycle 7), issues store E command 602-E to the distributed memory buffer system, the command including a memory address. In response, data chips DC-1 through DC-N release their respective slices of dataset E to the indicated memory address.

The method discussed with respect to FIG. 6 continues until all data buffered in the data chips is released to memory. It is noted here that the buffers of the distributed memory buffer system are each capable of stacking multiple slices of data. For example, the buffer of data chip DC-4 simultaneously holds data B4, C4, and D4 up until store cycle 4 when B4 is released to memory. In some embodiments of the present invention, the data chips keep track of the various memory slices in their respective buffers with reference to the tags (see FIG. 4) associated with the memory slices.

It is noted here, that in some conventional storage systems, sequence diagram 600 of FIG. 6 becomes elongated. For example, when slice B2 is received with errors on store cycle 2, in some conventional systems, the host resends all slices of dataset B down respective channels, in store cycle 3, and again in store cycle 4 (due to the repeated error of B2 on cycle 3). As a result, all slices of dataset C are delayed until store cycle 5, and this pushes dataset D out to cycle 6, which negatively impacts overall system throughput (bandwidth). The delay propagates through to subsequent store cycles, and increases in proportion to the number of data errors.

In contrast to some conventional storage systems discussed in the paragraph above, embodiments of the present invention avoid resending data slices that are received without error. Instead, bandwidth that otherwise would be used for unnecessarily resending good data slices is used to send data slices of subsequent datasets, thereby increasing overall system throughput. In a case where errors occur in more than one data slice on a given store cycle, embodiments of the present invention merely re-send only the slices with errors, on respective channels while concurrently sending slices of subsequent datasets on the same store cycle. This means errors on more than one dataset can be simultaneously recovered.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    sending, on a first data cycle, a first stripe of a first dataset and a second stripe of the first dataset, to a first data buffer and a second data buffer, respectively;
    receiving first information indicating that: (i) the first stripe of the first dataset was received, at the first data buffer, with no errors; and (ii) the second stripe of the first dataset was received, at the second data buffer, with errors;
    in response to receiving the first information, sending, on a second data cycle, a first stripe of a second dataset, and the second stripe of the first dataset, to the first data buffer and the second data buffer, respectively;
    receiving second information indicating that the second stripe of the first dataset was received, at the second data buffer, with no errors;
    in response to receiving the second information, sending a store command and a target address corresponding to the first dataset;
    triggering the first data buffer to send the first stripe of the first dataset to a first memory address, based at least in part, on the target address; and
    triggering the second data buffer to send the second stripe of the first dataset to a second memory address, based at least in part, on the target address;
    wherein the first stripe of the first dataset comprises:
        a first portion of the first dataset,
        an error detection code,
        a tag that identifies the first portion of the first dataset;
    wherein the first portion of the first dataset comprises at least one bit of the first dataset; and
    wherein the first data buffer and the second data buffer are physically separate from one another.

* * * * *